US012632783B2

(12) United States Patent
Zizzo et al.

(10) Patent No.: US 12,632,783 B2
(45) Date of Patent: May 19, 2026

(54) FEDERATED CONTINUAL LEARNING

(71) Applicant: INTERNATIONAL BUSINESS MACHINES CORPORATION, Armonk, NY (US)

(72) Inventors: Giulio Zizzo, Dublin (IE); Ambrish Rawat, Dublin (IE); Naoise Holohan, Maynooth (IE); Seshu Tirupathi, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 973 days.

(21) Appl. No.: 17/869,095

(22) Filed: Jul. 20, 2022

(65) Prior Publication Data

US 2024/0028947 A1     Jan. 25, 2024

(51) Int. Cl.
*G06N 20/00* (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS 11,139,961 B2    10/2021  Baracaldo Angel
2020/0242475 A1    7/2020  Kim
2022/0076114 A1    3/2022  Shaker
2022/0129706 A1*    4/2022  Vivona ................... G06N 3/045
2022/0398343 A1*    12/2022  Ou .......................... G06N 20/00

FOREIGN PATENT DOCUMENTS

CN    113614726 A    11/2021

OTHER PUBLICATIONS

Park, Tae Jin, Kenichi Kumatani, and Dimitrios Dimitriadis. "Tackling dynamics in federated incremental learning with variational embedding rehearsal." arXiv preprint arXiv:2110.09695 (2021) (Year: 2021).*
Dong, Jiahua, et al. "Federated class-incremental learning." Proceedings of the IEEE/CVF conference on computer vision and pattern recognition. 2022. (Year: 2022).*

(Continued)

*Primary Examiner* — Kakali Chaki
*Assistant Examiner* — Robert N Day
(74) *Attorney, Agent, or Firm* — Steven M. Bouknight

(57)          ABSTRACT

The present disclosure relates to a method comprising a training system iteratively training a machine learning algorithm using current training data. The current training data comprises a local dataset of a current task and a replay dataset and may be updated for a next iteration as follows. A training dataset may be received. If the training dataset is not a shared dataset and its task is different from the current task: information representing the local dataset may be shared with other training systems, the local dataset may be added to the replay dataset, and the received training dataset may be used as the local dataset for a next iteration. In case the task is the current task: the received training dataset may be added to the local dataset. If the training dataset is a shared dataset, the received training dataset may be added to the replay dataset.

13 Claims, 5 Drawing Sheets

(56) References Cited

OTHER PUBLICATIONS

Huang, Wenke, Mang Ye, and Bo Du. "Learn from Others and Be Yourself in Heterogeneous Federated Learning." 2022 IEEE/CVF Conference on Computer Vision and Pattern Recognition (CVPR). IEEE, 2022. (Year: 2022).*

Cha, Han, et al. "Federated reinforcement distillation with proxy experience memory." arXiv preprint arXiv:1907.06536 (2020). (Year: 2020).*

Casado et al., "Concept drift detection and adaptation for federated and continual learning", Multimedia Tools and Applications (2022), vol. 81, pp. 3397-3419.

Hendryx et al., "Federated Reconnaissance: Efficient, Distributed, Class-Incremental Learning", arXiv:2109.00150v1, Sep. 1, 2021, 14 pages.

Park et al., "Tackling Dynamics in Federated Incremental Learning with Variational Embedding Rehearsal", arXiv:2110.09695v1 Oct. 19, 2021, 12 pages.

Yoon et al., "Federated Continual Learning with Weighted Inter-client Transfer", Proceedings of the 38th International Conference on Machine Learning, PMLR, vol. 139, 2021, 14 pages.

Yoon et al., "FEDMIX: Approximation of Mixup Under Mean Augmented Federated Learning", Published as a conference paper at ICLR 2021, 19 pages.

Yoshida et al., "Hybrid-FL for Wireless Networks: Cooperative Learning Mechanism Using Non-IID Data", IEEE 2020, pp. 1-7.

* cited by examiner

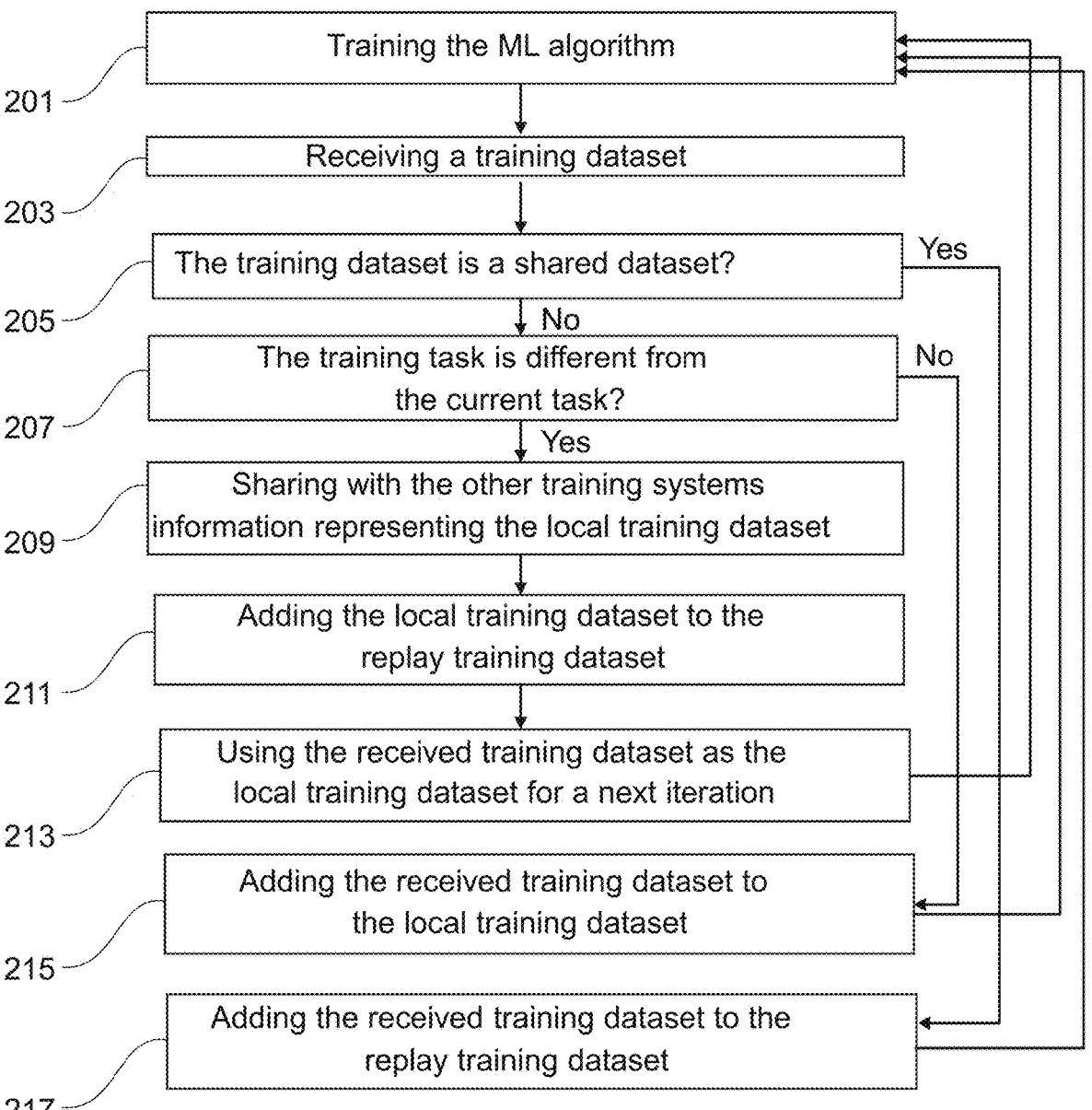

201

Training the ML algorithm

203

Receiving a training dataset

205

The training dataset is a shared dataset?                    Yes

No

207

The training task is different from
the current task?                                            No Yes

209

Sharing with the other training systems
information representing the local training dataset

211

Adding the local training dataset to the
replay training dataset

213

Using the received training dataset as the
local training dataset for a next iteration

215

Adding the received training dataset to
the local training dataset

217

Adding the received training dataset to the
replay training dataset

Fig. 2

FEDERATED CONTINUAL LEARNING

BACKGROUND

The present invention relates to the field of digital computer systems, and more specifically, to federated continual learning.

Continual learning may be an area of machine learning (ML) which is concerned with sequentially learning a series of new tasks. By default, the ML model may forget how to solve prior tasks as its weights are gradually updated with new data. This is called catastrophic forgetting. Rehearsal methods may be used to solve this issue. However, there is a need to improve these rehearsal methods.

SUMMARY

Various embodiments provide a method for federated continual learning, computer program product and training system as described by the subject matter of the independent claims. Advantageous embodiments are described in the dependent claims. Embodiments of the present invention can be freely combined with each other if they are not mutually exclusive.

In one aspect, the invention relates to a method for federated continual training of a machine learning (ML) algorithm by multiple training systems. The method comprises at each training system (herein referred to as local training system) of the training systems iteratively:

training the ML algorithm using current training data, the current training data comprising a training dataset (herein referred to as local training dataset) of a current training task currently assigned to the local training system, and a replay training dataset of one or more other training tasks previously assigned to the local training system and/or to one or more other training systems of the multiple training systems;

receiving a training dataset;

determining whether the training dataset is a shared dataset between the training systems;

in response to determining that training dataset is not a shared dataset between the training systems:

determining whether a given training task to which the training dataset belongs is different from the current training task;

in response to determining that the given training task is different from the current training task:

sharing with the other training systems information representing the local training dataset;

adding the local training dataset to the replay training dataset; and using the received training dataset as the local training dataset for a next iteration;

in response to determining that the given training task is the current training task: adding the received training dataset to the local training dataset;

in response to determining that the training dataset is a shared dataset between the training systems, adding the received training dataset to the replay training dataset.

In one aspect the invention relates to a computer program product comprising a computer-readable storage medium having computer-readable program code embodied therewith, the computer-readable program code configured to implement the method of the above embodiment.

In one aspect the invention relates to a training system for federated training of a machine learning model by multiple training systems. The training system is configured for iteratively:

training the ML algorithm using current training data, the current training data comprising a training dataset (herein referred to as local training dataset) of a current training task currently assigned to the training system, and a replay training dataset of one or more other training tasks previously assigned to the training system and/or to one or more other training systems of the multiple training systems;

receiving a training dataset;

determining whether the training dataset is a shared dataset between the training systems;

in response to determining that the training dataset is not a shared dataset between the training systems:

determining whether a given training task of the training dataset is different from the current training task;

in response to determining that the given training task is different from the current training task:

sharing with the other training systems information representing the local training dataset;

adding the local training dataset to the replay training dataset; and using the received training dataset as the local training dataset for a next iteration;

in response to determining that the given training task is the current training task: adding the received training dataset to the local training dataset;

in response to determining that the training dataset is a shared dataset between the training systems, adding the received training dataset to the replay training dataset.

BRIEF DESCRIPTION OF THE DRAWINGS

In the following embodiments of the invention are explained in greater detail, by way of example only, making reference to the drawings in which:

FIG. 2 is a flowchart of a method for contributing to a federated continual training of a machine learning (ML) algorithm in accordance with an example of the present subject matter.

DETAILED DESCRIPTION

Figure 1:
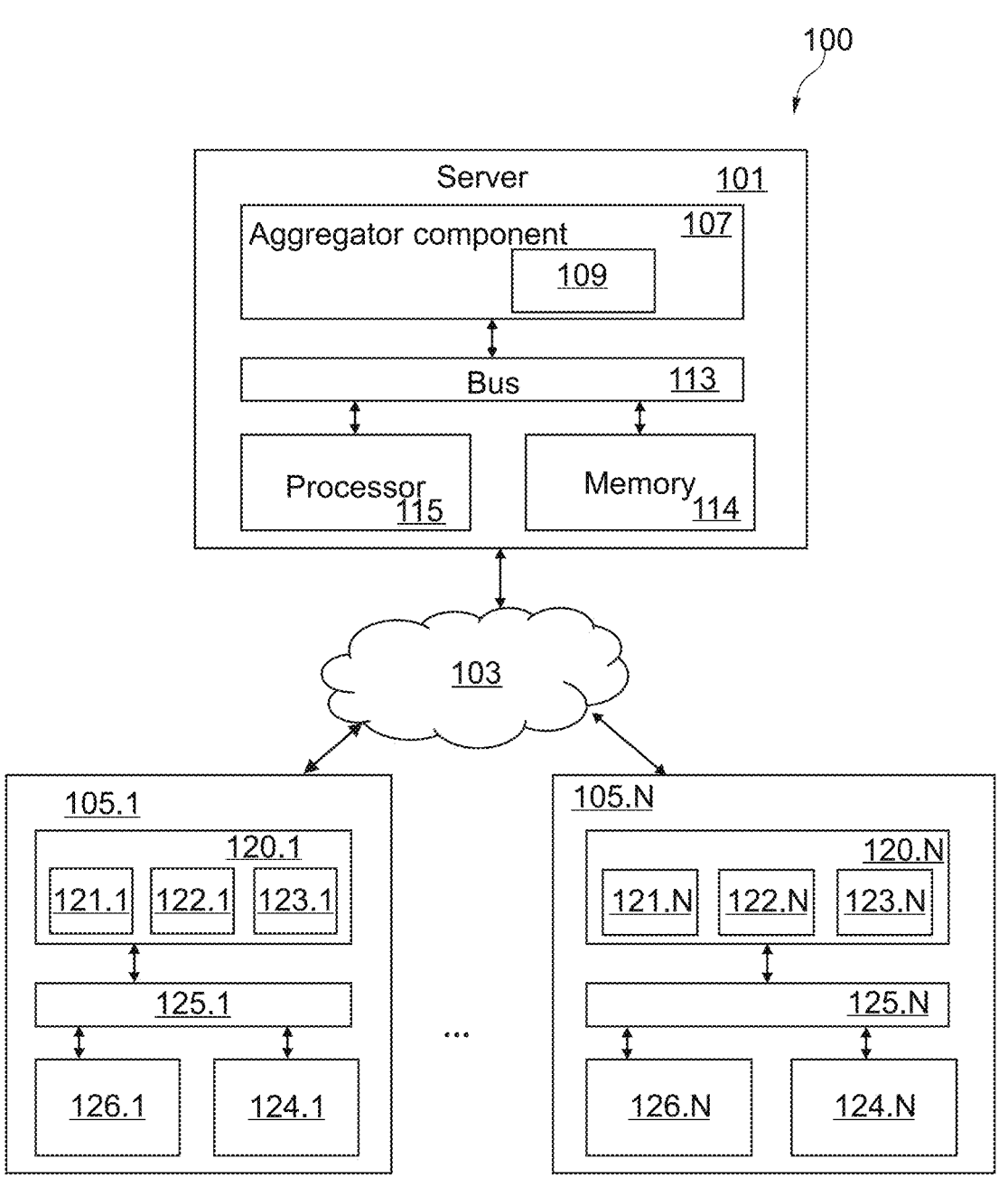
FIG. 1 illustrates a diagram of a computer system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present subject matter may enable an efficient federated continual learning. The federated learning comprises training a machine learning algorithm across multiple decentralized training systems. The federated learning according to the present subject matter may enable multiple contributors to build a common robust machine learning model. Each training system may be configured to perform continual machine learning by retraining the ML algorithm with updated shared data, which shared data may, for example, be provided as a balanced common replay buffer at the training system. This may enable to gain strong performance boosts. The continual learning according to the present subject matter may enable the ML algorithm to sequentially learn a series of new tasks while preventing the so-called catastrophic forgetting.

The federated continual learning may thus be enabled by the multiple training systems. Each training system of the multiple training systems may be configured to receive shared training data and local training data in order to train the same ML algorithm. The training of the ML algorithm may comprise a regular training using the local training dataset and a rehearsal training using the replay training dataset. The ML algorithm may, for example, be trained for object recognition in images or image classification. The ML algorithm may, for example, be a deep neural network (DNN). For ease of the description, each training system may be referred to as "local training system" and remaining training systems of the multiple training systems may be referred to as "non-local training systems". The training task assigned to or received by the local training system may be referred to as local task. The training task assigned to a non-local training system may be referred to as non-local task. In one example, the local training system may receive training data of a stream of local tasks and/or shared training data of the training systems e.g., the shared training data may be received from a centralized module referred to as aggregator, where the aggregator receives from training systems training data, combines it and then shares the combined data among the training systems. The local training system may comprise a local buffer and a replay buffer. The local buffer may store training data of a current local task currently assigned to the local training system. The replay buffer may store training data of one or more previous local tasks and/or training data of one or more non-local tasks. In one example implementation, the whole content of the replay buffer may be received from the aggregator. For that, the local training system may send the previous local training data to the aggregator who also receives previous non-local training data from non-local training systems, the aggregator may combine the received data and share the combined data with all training systems including the local training system, which shared data may be stored in the replay buffer. In another example implementation, the content of the replay buffer may partially be provided by the local training system because the local training system may store (itself without going through the aggregator) in the replay buffer the previous local training data and receive non-local training data from the aggregator. In this example, the local training system may (still) send the previous local training data to the aggregator who also receives previous non-local training data from non-local systems, and for each training system X the aggregator may combine the non-local training data which are received from training systems different from X and send the combined data to training system X. The training task or task as used herein may refer to a training dataset comprising data samples and corresponding labels. For example, each task may define a separate or distinct classification problem, e.g., one task may enable to classify different types of dogs and another task may enable to classify different types of birds. The training dataset may comprise entries, wherein each entry comprises a data sample and associated label.

The local training dataset and the replay training dataset may, for example, comprise entries. Each entry of the entries may comprise a data sample and an associated label. The data sample may, for example, be an image e.g., the image may be a single MNIST image, a centroid or mean image computed from multiple images of the same class. For example, the data sample of the replay training dataset may comprise a combined image/output such as centroid image or mean image that is obtained/computed from multiple images, while the data sample of the local training dataset may comprise a single image. In case the ML algorithm is a DNN, a data sample may comprise an output of a $K^{th}$ layer of the DNN after training the DNN with a respective image (or with a respective computed mean/centroid image); that is, each output created by the initial K layers of the DNN may provide a simplified model of the respective image. The entries having these outputs may be referred to as latent data as they provide latent representation of the images. The remaining entries may be referred to as non-latent data. Thus, the training of the DNN using the local training dataset and the replay training dataset may be performed by first training the layers K+1 to final layer of the DNN using latent data and thereafter training the whole DNN using the non-latent data. The latent data may be part of the local training dataset and/or replay training dataset. The non-latent data may be part of the local training dataset and/or replay training dataset.

The local training system may be configured to repeatedly train the ML algorithm using the content of the local buffer and the replay buffer, wherein the training is repeated in response to a change in the content of at least one of the local and replay buffers. The training of the ML algorithm may comprise a regular training using the data of the local buffer and a rehearsal training using the data in the replay buffer. The training data stored in the local buffer may or may not have the same format as the training data stored in the replay buffer. The format of the training data may be defined by the format of the data samples of the training data e.g., a data sample of a first format may comprise an image, while a data sample of another format may comprise an intermediate output of a neural network that is trained by the image.

The local training system may be configured to update the content of the local buffer and eventually the replay buffer if training data of a new local task is received. In particular, if the new local task is different from the current local task, information on the current content of the local buffer may be shared with the non-local training systems, the current content of the local buffer may be replaced with the new received training data and optionally the current content may be moved to the replay buffer. If the new local task is the same as the current local task, the new training data may be added to the current content of the local buffer. The local training system may further be configured to update the content of replay buffer if shared training data between the training systems is received, by adding the received shared training data to the replay buffer.

The present subject matter may advantageously be used in wearable health devices which have a large non id data skews and the data distribution can change with peoples' behavior, in voice recognition systems learning with new users but retaining performance on old users and in wide ranging image recognition systems (self-driving cars, photo apps, etc) due to natural changes in environments.

The term machine learning (ML) refers to a computer algorithm used to extract useful information from training data sets by building probabilistic models (referred to as machine learning models or predictive models) in an automated way. Machine learning algorithms build a mathematical model based on sample data, known as "training data", in order to make predictions or decisions without being explicitly programmed to perform the task. The machine learning may be performed using a learning algorithm such as supervised or unsupervised learning, [clustering, classification, linear regression] reinforcement algorithm, self-learning, etc. The machine learning may be based on various techniques such as clustering, classification, linear regression, support vector machines, neural networks, etc. A model or predictive model may for example be a data structure or program such as a neural network, a support vector machine, a decision tree, a Bayesian network etc. The model is adapted to predict an unmeasured value (e.g. which tag corresponds to a given token) from other, known values and/or to predict or select an action to maximize a future reward.

According to one embodiment, sharing the information comprises: anonymizing the local training dataset, wherein the shared information comprises the anonymized data. This embodiment may enable to collect and shared information while preserving the privacy.

According to one embodiment, the machine learning algorithm is trained for object recognition in images, wherein the sharing of the information comprises: computing from object images of the local training dataset T image means per object class, where T>=1, and applying a differentially private (DP) method to the image means, wherein the shared information comprises the resulting DP image means in association with corresponding object classes. The application of the DP method to an image may comprise addition of noise to the image e.g., in order to blur or add mosaic effect to the image. This embodiment may enable to collect and share information while preserving the privacy.

According to one embodiment, the sharing is performed through an aggregator by sending the DP image means to the aggregator. The aggregator is configured to compute M centroids per object class from the T image means of the object class and from other image means received from other training systems, where M<T, and send the centroids to the training systems. The received centroids may be stored in association with their object classes by each training system in the replay buffer of the training system.

According to one embodiment, the machine learning algorithm is a deep neural network (DNN) having n layers, wherein sharing the information representing to the local training dataset comprises: sharing information relating to the outputs of the initial K layers of the DNN that result from the training of the DNN using the local training dataset. For example, each of the determined T image means may be used to train the DNN, and the output at the $K^{th}$ layer of the DNN may be extracted. This may result in a number T of outputs associated with T image means respectively. These T outputs in association with the object class may be sent to the aggregator. The aggregator may thus receive these T entries, but also other similar entries from other non-local training systems. The aggregator may compute M centroid output from the received outputs and share these M centroids with all training systems. Every training system that receives this latent data may use it to train layer K+1 to the final layer of the DNN, before training the whole DNN using non-latent training data.

In one example implementation where the content of the replay buffer is jointly provided by the training system and the aggregator, the replay buffer may comprise two sub-buffers. The first sub-buffer may comprise training data of previous local tasks. The second sub-buffer may comprise training data of non-local tasks. This separation may be advantageous if the format of the training data of local tasks is different from the format of the training data of the non-local tasks. In this case, different training approaches may be performed using the two sub-buffers. In another example, the aggregator provides all the content of the replay buffer by combining the previous training data of the training systems and then shares the combined training data with all training systems; in this case, the replay training data may have the same format.

According to one embodiment, the machine learning algorithm is a DNN having n layers. The received training data is of a shared dataset that comprises latent data of the DNN e.g., an output of the $K^{th}$ layer of the trained DNN may be a latent representation of the input data of the DNN used for training. Thus, the replay buffer may comprise latent and non-latent replay data. For example, the received training data comprises outputs of the initial K layers of the DNN, wherein the training comprises: training layers K+1 to the final layer of the DNN with the latent replay data, and thereafter training all layers of the DNN with local training dataset and any non-latent replay data.

Despite DP guarantees, users may want additional and more visual privacy. Therefore, this embodiment may enable to build the replay buffer from intermediate layer representations of the data. For example, at end of a training round, the training system may regenerate the latent representations based on its local data buffer and shares them with the aggregator along with its weights. As described above, the training system may have two replay sub-buffers: a sub-buffer gathered from purely local task training data and a sub-buffer comprised of latent data shared globally. If intermediate layer data is shared between training systems a training protocol may use the latent data to perform the training.

According to one embodiment, the method further comprises sending the trained ML model to an aggregator. The aggregator is configured for combining the individual trained ML models from the training systems to provide one trained ML model.

According to one embodiment, the method further comprises: receiving from an aggregator configuration data for the DP method, and using the configuration data for the application of the DP method.

FIG. 1 illustrates a diagram of a computer system in accordance with an example of the present subject matter. The computer system 100 may enable a federated learning environment.

The computer system 100 comprises a server 101, one or more networks 103 and training systems 105.1-N.

The server 101 may comprise an aggregator component 107. The aggregator component 107 may comprise communications component 109. The server 101 may comprise a memory 114. The server 101 may further comprise a system bus 113 that can couple to various components such as, but not limited to, the aggregator component 107 and associated components, memory 114 and/or a processor 115.

The server 101 may communicate with the training systems 105.1-N (and vice versa) using one or more networks 103. The one or more networks 103 may comprise wired and/or wireless networks, including, but not limited to, a cellular network, a wide area network (WAN) (e.g., the Internet) or a local area network (LAN).

As shown in FIG. 1, each of the training systems 105.1-N may comprise a processing component 120.1-N. The processing component 120.1-N may comprise machine learning component 121.1-N, a privacy module 122.1-N and a data fetcher 123.1-N. The training system 105.1-N may comprise a memory 124.1-N. The training system 105.1-N may further comprise a system bus 125.1-N that may couple to various components such as, but not limited to, the processing component 120.1-N and associated components, memory 124.1-N and/or processor 126.1-N.

The computer system 100 may enable a federated continual learning environment in which the training systems 105.1-N are parties participating in the federated learning environment. In particular, the machine learning component 121.1-N of each training system 105.1-N may be configured to train locally a same machine learning algorithm in order to provide an individual trained machine learning model. The machine learning algorithm may, for example, be a classification algorithm e.g., the machine learning algorithm may be a DNN. The training may be performed using local training data and shared replay training data of the training systems.

The data fetcher 123.1-N may be configured to handle configurations e.g., of the training, and to handle the data shared with other training systems e.g., the data fetcher 123.1-N may indicate what layer of the DNN to share with the other training systems e.g., sharing original data from layer 0 and data up to an arbitrary depth k. The data fetcher 123.1-N may define a representation of the data to be shared, for example, simple mean of features, or more complex exemplar calculations.

The privacy module 122.1-N may implement a differential privacy method on data provided by the data fetcher 123.1-N. The aggregator component 107 may play a typical federated learning role such as averaging weights of the individual trained ML models, but also combining sharable replay buffers given by the training systems 105.1-N.

On start, the aggregator component 107 may dispatch to the training systems 105.1-N the parameters of the training protocol including: the training algorithm to be trained, model weights and architecture, size of the replay buffer, DP noise levels to be used by the privacy module, etc. Each training system trains locally using the current task data plus any replay buffer data it may have from prior tasks following the relevant training protocol.

FIG. 2 is a flowchart of a method for contributing to a federated continual training of a ML algorithm in accordance with an example of the present subject matter. For the purpose of explanation, the method described in FIG. 2 may be implemented in the system illustrated in FIG. 1, but is not limited to this implementation. Each of the training systems 105.1-N may be configured to perform the method of FIG. 2. In the following description, the method may be performed by the training system 105.1. This training system 105.1 may thus be referred to as local training system and the remaining training systems 105.2-N may be referred to as non-local training systems (from the view of the local training system 105.1). The training task assigned to the local training system 105.1 may be referred to as local task, and the training task assigned to a non-local training system may be referred to as a non-local task.

Assigning a task to a training system may mean that the training system receives training data whose content and/or format is defined according to the task. The training system may receive together with the training data a definition of the assigned task. Alternatively, the training system may infer this definition from the received training data. The task may, for example, define the format of the entries of the training data e.g., the task may indicate that the training data comprises Modified National Institute of Standards and Technology (MNIST) images in association with respective labels, or inverted MNIST images in association with respective labels or color digit images in association with respective labels.

The ML algorithm may be trained in step 201 using current training data. For example, the machine learning component 121.1 may be configured to train the ML algorithm in step 201. The learning may, for example, be a supervised machine learning. The current training data comprises a training dataset (herein referred to as local training dataset) of a current local training task and a replay training dataset. The replay training dataset is associated with one or more previous local training tasks previously assigned to the local training system and/or with one or more non-local training tasks of the multiple training systems. The replay training dataset may be used for the purpose of rehearsal training. For example, the local training dataset and the replay training dataset may comprise entries, wherein each entry comprises a data sample and associated label. In one example, the entry may comprise an object image and associated label which may be a class of the object. The format of each entry of the entries may or may not be the same as the format of the other entries. For example, the entry may comprise one single object image and associated object class. In another example, the entry may comprise an object class in association with several object outputs obtained, as intermediate outputs in a DNN, from a training round of respective images of that object class.

In one example implementation, the local training system 105.1 may comprise a local buffer and a replay buffer. The local buffer may be configured to store the local training dataset and the replay buffer may store the replay training dataset. The local training system 105.1 may be configured to use the current content of the local buffer and the replay buffer to train the ML algorithm in step 201. The content of the local buffer and the replay buffer may, for example, be updated using steps 203 to 207 and 211 to 217.

A training dataset may be received in step 203. In one first example implementation, the local training system 105.1 may be configured to receive a stream of training data of different local tasks and receive shared training data from the aggregator component 107, wherein the shared training data is provided by training systems 105.1-N to the aggregator component 107. The training dataset may be received in the context of the first implementation example e.g., as part of the stream or as part of the shared data.

It may be determined in step 205 whether the received training dataset is a shared dataset between the training systems 105.1-N. Determining whether the received training dataset is a shared dataset between the training systems may comprise determining whether the training dataset is received from the aggregator. In another example, determining whether the received training dataset is a shared dataset may comprise determining whether the received training dataset belongs to a local given training task of the local training system.

In response to determining that the training dataset is not a shared dataset, it may be determined in step 207 whether the given training task is different from the current training task. Determining that the training dataset is not a shared dataset may comprise determining whether the training dataset is of the given training task.

In case a training task to which the received training dataset belongs is different from the current training task, steps 209 to 213 may be performed; otherwise, step 215 may be performed.

Figure 3:
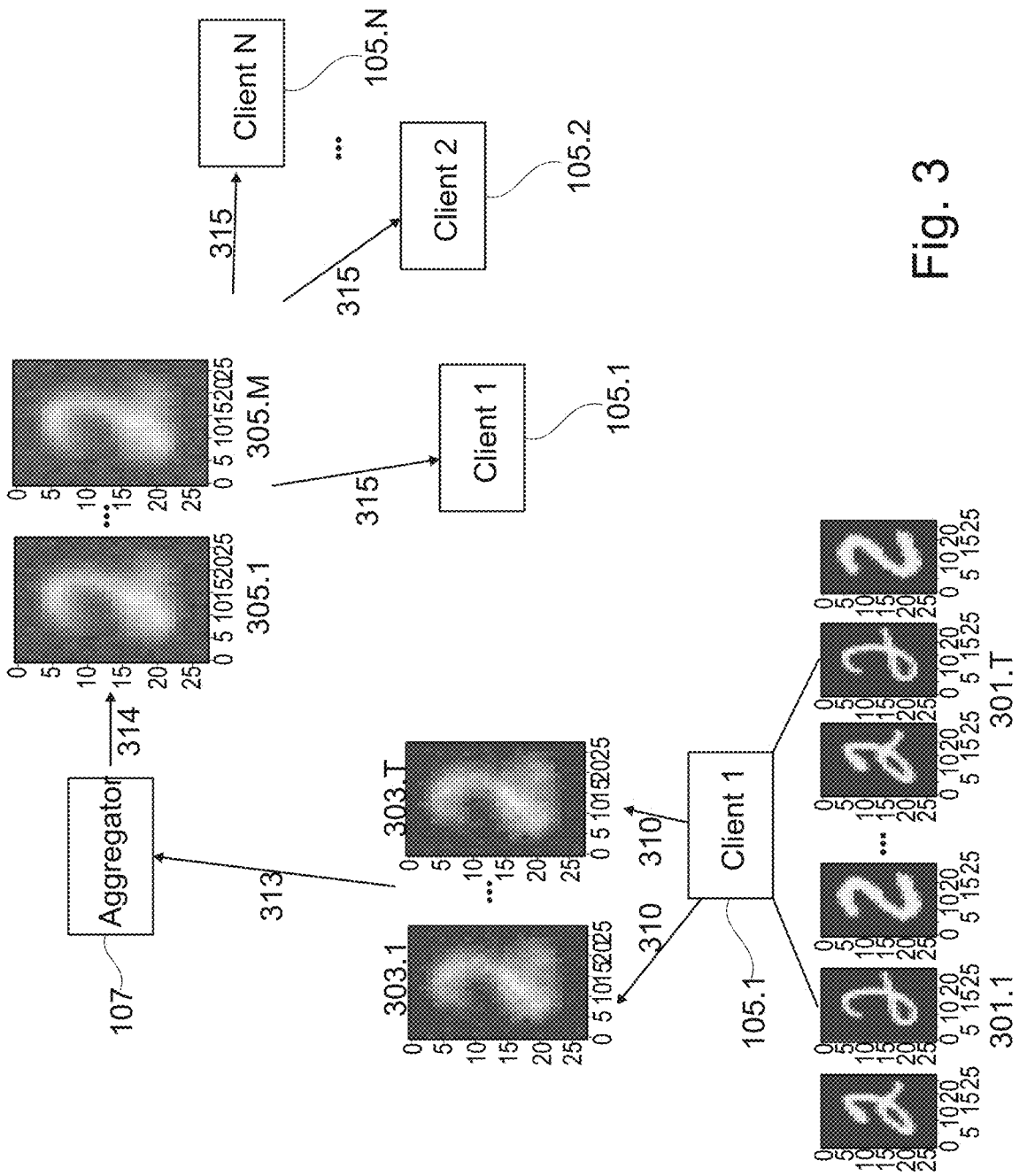
FIG. 3 depicts a diagram illustrating a method for sharing information representing training data according to an example of the present subject matter.
Figure 4:
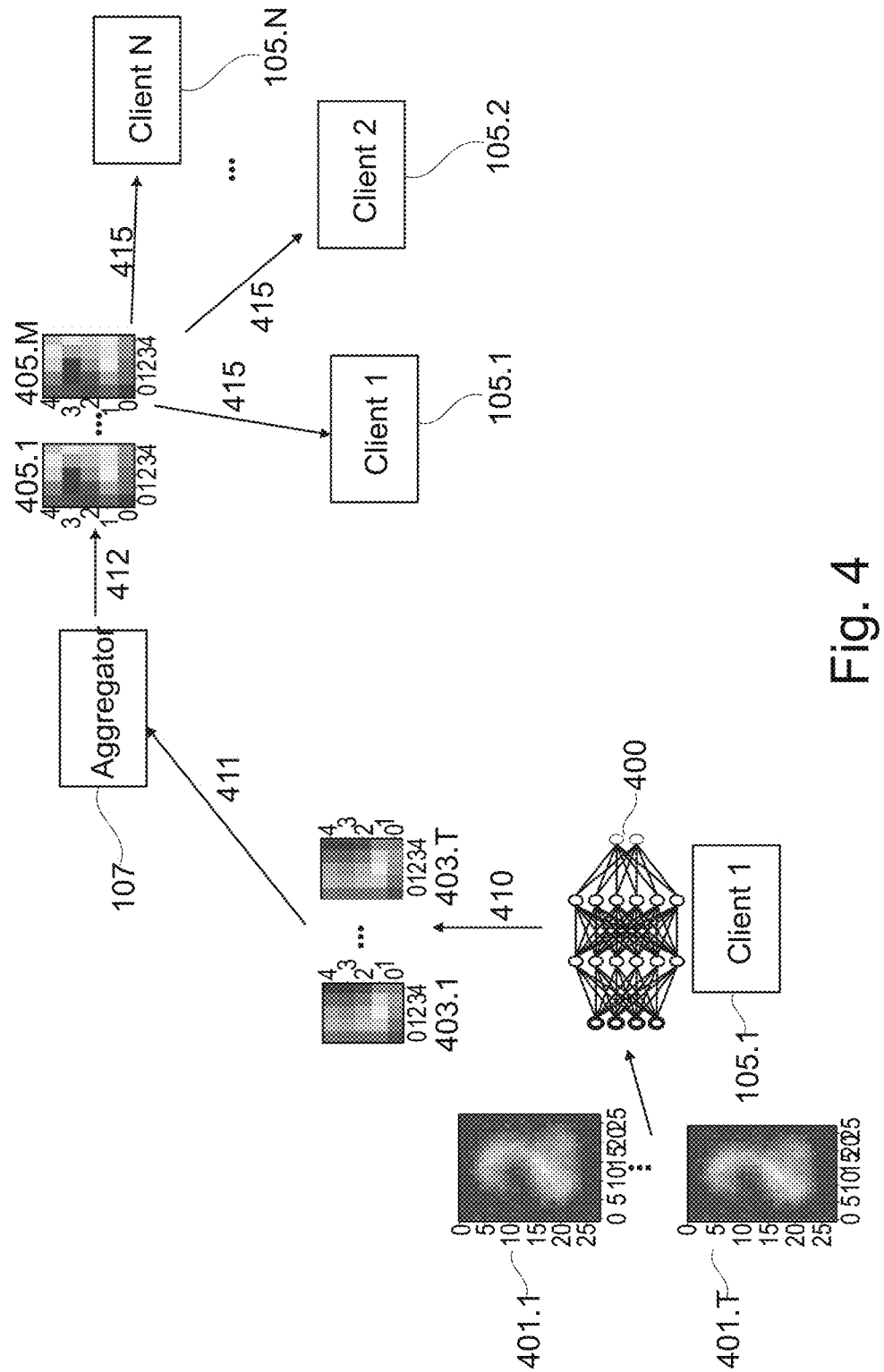
FIG. 4 depicts a diagram illustrating a method for sharing information representing training data according to an example of the present subject matter.

Information representing the local training dataset may be shared in step 209 with the other training systems. In one example, the information may be anonymized by the privacy module 122.1 so that the information shared in step 209 is the anonymized information. In one example, the sharing of the information may be performed by sending the information by the local training system 105.1 to the server 101, and the aggregator component 107 may combine the received information with other information sent by other training systems and share the combined information with the training systems 105.1-N. FIGS. 3 and 4 provide an example implementation of step 209.

The local training dataset may be added in step 211 to the replay training dataset. Following the buffer implementation example, step 211 may be performed by storing the local training dataset in the replay buffer.

The received training dataset may be provided in step 213 as the local training dataset for a next iteration. Following the buffer implementation example, step 213 may be performed by storing the received training dataset in the local buffer.

The received training dataset may be added in step 215 to the local training dataset. Following the buffer implementation example, step 215 may be performed by storing the received training dataset in the local buffer which already stores the local training dataset.

In response to determining that the received training dataset is a shared dataset, the received training dataset may be added in step 217 to the replay training dataset. For example, receiving the training dataset from a centralized module such as the aggregator 107 may be an indication that the training dataset is a shared dataset. Thus, in response to receiving the training dataset from the aggregator 107, the received training dataset may be added in step 217 to the replay training dataset. Following the buffer implementation example, step 217 may be performed by storing the received training dataset in the replay buffer which already stores the replay training dataset.

As indicated in FIG. 2, the method steps of FIG. 2 may repeatedly be performed after step 213, 215 or 217. In one example, the repetition may be performed until a stop criterion is fulfilled. The stop criterion may, for example, require reaching a maximum number of repetitions.

FIG. 3 depicts a diagram illustrating a method for sharing information representing training data according to an example of the present subject matter. The method may enable to share data between clients in a privacy-performance trade off to be agreed upon by the users. Clients 1-N of FIG. 3 refer to the training systems 105.1-N respectively. For simplification of the description, FIG. 3 shows only client 1 which shares information representing training data. In this example, the training data comprises MNIST images and associated labels.

When a task change is signalled, current training data may undergo a series of anonymization steps and may globally be shared. For example, the client 1 may locally compute T differentially private (DP) feature means 303.1-T per class held over T shards of its data. FIG. 3 shows an example of T shards 301.1-T for one class, each shard comprising three MNIST images from which client 1 has generated (310) respective image means 303.1-T. The client 1 sends (313)

the T means to the aggregator 107. The aggregator 107 may thus receive the per-class feature means from the client 1 but also from other clients 2-N. The aggregator 107 may then re-compute (314) M centroids 305.1-M per class from the received image means. FIG. 3 shows only the M centroids for one class for simplification of the description. These centroids 305.1-M are shared (315) between clients and put in each client's replay buffer. The replay buffer of each client may be composed of a mix of local replay data and globally shared data. The local replay data comprises training data of previous local tasks and the globally shared data comprises training data of non-local tasks. The present method may provide strong performance boosts in non-iid data distributions between clients.

FIG. 4 depicts a diagram illustrating a method for sharing information representing training data according to an example of the present subject matter. Clients 1-N of FIG. 4 refer to the training systems 105.1-N respectively. FIG. 4 shows client 1 which shares information representing training data. In this example, the training data comprises MNIST images and associated labels and the ML algorithm is a DNN 400 of n layers.

At the start of a training round of images 401.1-T of the training data to be shared, the client 1 may receive a new set of updated latent representations along with the new global weight vector. In particular, the outputs 403.1-T of the initial K layers of the DNN 400 obtained (410) by computing T means (potentially with differential privacy) 401.1-T over T shards of the current training data as passing them through the initial K layers of the DNN 400. The outputs 403.1-T are provided (411) by the client 1 to the aggregator 107, and other clients may send similar outputs per class to the aggregator 107. The aggregator 107 may then re-compute (412) M centroids 405.1-M per class from the outputs received from the clients. FIG. 4 shows only the M centroids for one class for simplification of the description. These centroids 405.1-M are shared (415) between clients and put in each client's replay buffer. Then, the local training may proceed as follows: the layers from K+1 to the final layer may be trained with latent data of the replay buffer. Then for B batches, all layers are updated with all non-latent data from the replay buffer and current training data.

Figure 5:
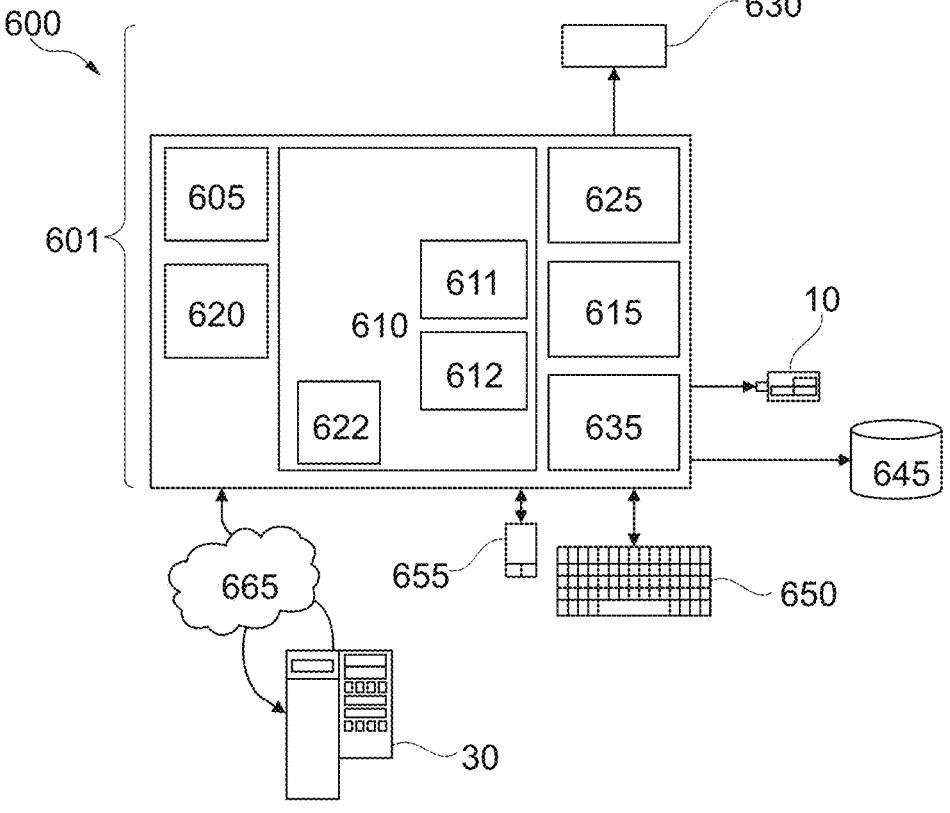
FIG. 5 represents a computerized system, suited for implementing one or more method steps as involved in the present subject matter.

FIG. 5 represents a general computerized system 600 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 612, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in Figure the computer 601 includes a processor 605, memory (main memory) 610 coupled to a memory controller 615, and one or more input and/or output (I/O) devices (or peripherals) 645 that are communicatively coupled via a local input/output controller 635. The input/ output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor-based microprocessor (in the form of a microchip or chip set), or generally any device for executing software instructions.

The memory 610 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention. In the example of FIG. 5, software in the memory 610 includes instructions 612 e.g. instructions to manage databases such as a database management system.

The software in memory 610 shall also typically include a suitable operating system (OS) 611. The OS 611 essentially controls the execution of other computer programs, such as possibly software 612 for implementing methods as described herein.

The methods described herein may be in the form of a source program 612, executable program 612 (object code), script, or any other entity comprising a set of instructions 612 to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 5, the methods can be stored on any computer readable medium, such as storage 620, for use by or in connection with any computer related system or method. The storage 620 may comprise a disk storage such as HDD storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for federated continual training of a machine learning (ML) algorithm by a plurality of training systems, the method comprising at each training system associated with the plurality of training systems:

training the ML algorithm using current training data, the current training data comprising a training dataset of a current training task currently assigned to a training system, and a replay training dataset of one or more other training tasks previously assigned to the training system and the one or more other training systems of the plurality of training systems;

receiving the training dataset at the training system from the plurality of training systems, wherein the training system comprises a local buffer and a replay buffer, wherein the replay buffer further comprises at least two sub-buffers including a first sub-buffer comprising training data of previous local tasks and a second sub-buffer comprising training data of non-local tasks;

determining whether the training dataset is a shared dataset between the plurality of training systems;

in response to determining that the training dataset is not a shared dataset:

determining whether a given training task of the training dataset is different from the current training task;

in response to determining that the given training task is different from the current training task:

sharing with the one or more other training systems information representing the training dataset;

adding current content from the current training task to the replay training dataset of the first sub-buffer; and using the training dataset as the training dataset for a next iteration;

in response to determining that the given training task is the current training task:

adding the training dataset to the current content from the current training task of the training system; and in response to determining that the training dataset is a shared dataset of the plurality of training systems, adding the training dataset to the replay training dataset of the second sub-buffer.

2. The method of claim 1, wherein sharing the information further comprises anonymizing the training dataset, and wherein the shared information comprises the anonymized training dataset.

3. The method of claim 1, wherein the ML algorithm is trained for object recognition in images, and wherein sharing the information further comprises:

computing from object images of the training dataset T image means per object class; and applying a differentially private (DP) method to the image means;

wherein the shared information comprises resulting DP image means in association with an object class.

4. The method of claim 3, wherein the sharing is performed through an aggregator, and wherein the sharing further comprises:

sending the DP image means to the aggregator, wherein the aggregator computes M centroids per object class from the T image means and from other image means received from the plurality of training systems, where M<T; and sending the centroids to the plurality of training systems.

5. The method of claim 1, wherein the ML algorithm comprises a deep neural network (DNN) having n layers, wherein sharing the information representing the training dataset further comprises:

sharing information representing outputs of initial K layers of the DNN that result from the training of the DNN using the local training dataset.

6. The method of claim 1, wherein the ML algorithm comprises a deep neural network (DNN) having n layers, wherein the replay training data comprises entries, each entry of at least part of the entries comprising an output of initial K layers of the DNN, and wherein the training comprises:

training layers K+1 to a final layer of the DNN with the replay training data and thereafter training all layers of the DNN with the training dataset and non-latent replay training data.

7. The method of claim 1, further comprising:

sending the trained ML algorithm to an aggregator, wherein the aggregator combines individually trained ML algorithms from the plurality of training systems to provide one trained ML model.

8. The method of claim 4, further comprising:

receiving from the aggregator configuration data for the DP method, and using the configuration data for the application of the DP method.

9. The method of claim 1, wherein each training task defines a specific distribution of corresponding training data.

10. A computer program product comprising a computer-readable storage medium having computer-readable program code embodied therewith, wherein the computer-readable program code implements a method for federated continual training of a machine learning (ML) algorithm by a plurality of training systems, comprising, at each training system associated with the plurality of training systems:

training the ML algorithm using current training data, the current training data comprising a training dataset of a current training task currently assigned to a training system, and a replay training dataset of one or more other training tasks previously assigned to the training system and the one or more other training systems of the plurality of training systems;

receiving the training dataset at the training system from the plurality of training systems, wherein the training system comprises a local buffer and a replay buffer, wherein the replay buffer further comprises at least two sub-buffers including a first sub-buffer comprising training data of previous local tasks and a second sub-buffer comprising training data of non-local tasks;

determining whether the training dataset is a shared dataset between the plurality of training systems;

in response to determining that the training dataset is not a shared dataset:

determining whether a given training task of the training dataset is different from the current training task;

in response to determining that the given training task is different from the current training task:

sharing with the one or more other training systems information representing the training dataset;

adding current content from the current training task to the replay training dataset of the first sub-buffer; and using the training dataset as the training dataset for a next iteration;

in response to determining that the given training task is the current training task:

adding the training dataset to the current content from the current training task of the training system; and in response to determining that the training dataset is a shared dataset of the plurality of training systems, adding the training dataset to the replay training dataset of the second sub-buffer.

11. A system for federated training of a machine learning (ML) model by a plurality of training systems, the training system being configured for:

training the ML model using current training data, the current training data comprising a training dataset of a current training task currently assigned to a training system, and a replay training dataset of one or more other training tasks previously assigned to the training system and the one or more other training systems of the plurality of training systems;

receiving the training dataset at the training system from the plurality of training systems, wherein the training system comprises a local buffer and a replay buffer, wherein the replay buffer further comprises at least two sub-buffers including a first sub-buffer comprising training data of previous local tasks and a second sub-buffer comprising training data of non-local tasks;

determining whether the training dataset is a shared dataset between the plurality of training systems;

in response to determining that the training dataset is not a shared dataset:

determining whether a given training task of the training dataset is different from the current training task;

in response to determining that the given training task is different from the current training task:

sharing with the one or more other training systems information representing the training dataset;

adding current content from the current training task to the replay training dataset of the first sub-buffer; and using the training dataset as the training dataset for a
next iteration;

in response to determining that the given training task is
the current training task:

adding the training dataset to the current content from
the current training task of the training system; and in response to determining that the training dataset is a
shared dataset of the plurality of training systems,
adding the training dataset to the replay training dataset
of the second sub-buffer.

12. The system of claim 11 further comprising an aggregator, wherein the aggregator receives shared information from the training system and sends the shared information to other training systems.

13. The system of claim 12, wherein the aggregator further receives individual trained ML models from the training systems respectively and combines the individual trained ML models to provide one trained ML model.

\* \* \* \* \*